(12) United States Patent
Holzapfel et al.

(10) Patent No.: US 9,242,871 B2
(45) Date of Patent: Jan. 26, 2016

(54) NANOPARTICULATE COMPOSITION AND METHOD FOR ITS PRODUCTION

(75) Inventors: Michael Holzapfel, München (DE);
Andreas Laumann, München (DE);
Peter Bauer, Buch am Erlbach (DE);
Christian Vogler, Moosburg (DE);
Guoxian Liang, St.-Hyacinthe (CA)

(73) Assignee: Johnson Matthey PLC, London (GB)

( * ) Notice: Subject to any disclaimer, the term of this patent is extended or adjusted under 35 U.S.C. 154(b) by 783 days.

(21) Appl. No.: 12/746,059

(22) PCT Filed: Dec. 8, 2008

(86) PCT No.: PCT/EP2008/010399
§ 371 (c)(1),
(2), (4) Date: Oct. 27, 2010

(87) PCT Pub. No.: WO2009/071332
PCT Pub. Date: Jun. 11, 2009

(65) Prior Publication Data
US 2011/0037030 A1 Feb. 17, 2011

(30) Foreign Application Priority Data
Dec. 6, 2007 (DE) .......... 10 2007 058 674

(51) Int. Cl.
| H01B 1/02 | (2006.01) |
| --- | --- |
| H01M 4/58 | (2010.01) |
| C01G 23/053 | (2006.01) |
| B82Y 30/00 | (2011.01) |
| C01B 25/37 | (2006.01) |
| C01B 25/45 | (2006.01) |
| C01G 1/00 | (2006.01) |
| C01G 1/02 | (2006.01) |
| C01G 1/10 | (2006.01) |
| C01G 23/00 | (2006.01) |
| C01G 23/047 | (2006.01) |
| H01M 4/485 | (2010.01) |
| C01G 49/00 | (2006.01) |

(52) U.S. Cl.
CPC ............. *C01G 23/0536* (2013.01); *B82Y 30/00* (2013.01); *C01B 25/375* (2013.01); *C01B 25/45* (2013.01); *C01G 1/00* (2013.01); *C01G 1/02* (2013.01); *C01G 1/10* (2013.01); *C01G 23/005* (2013.01); *C01G 23/047* (2013.01); *H01M 4/485* (2013.01); *H01M 4/5825* (2013.01); *C01G 49/00* (2013.01); *C01P 2004/64* (2013.01); *C01P 2006/40* (2013.01); *Y02E 60/122* (2013.01)

(58) Field of Classification Search
CPC ........ H01B 1/02; H01M 4/58; H01M 4/5825; C01P 2004/51; C01P 2004/60; C01P 2004/62; C01P 2004/64; B82Y 30/00; C01G 49/00

USPC ................. 252/512, 513, 515, 519.12, 519.2, 252/520.2, 520.4, 520.5, 521.2; 428/403, 428/402
See application file for complete search history.

(56) References Cited

U.S. PATENT DOCUMENTS

| | | | |
| --- | --- | --- | --- |
| 4,803,064 A * | 2/1989 | Montino et al. .............. 423/612 |
| 5,401,313 A * | 3/1995 | Supplee et al. ................. 106/12 |
| 5,910,382 A | 6/1999 | Goodenough et al. |
| 6,749,648 B1 | 6/2004 | Kumar et al. |
| 6,855,273 B2 | 2/2005 | Ravet et al. |
| 6,962,666 B2 | 11/2005 | Ravet et al. |
| 7,285,260 B2 | 10/2007 | Armand et al. |
| 7,344,659 B2 | 3/2008 | Ravet et al. |
| 7,457,018 B2 | 11/2008 | Armand et al. |
| 7,534,408 B2 | 5/2009 | Gauthier et al. |
| 7,601,318 B2 | 10/2009 | Armand et al. |
| 7,749,319 B2 | 7/2010 | Inbe et al. |
| 7,807,121 B2 | 10/2010 | Nuspl et al. |
| 7,815,819 B2 | 10/2010 | Ravet et al. |
| 7,998,618 B2 | 8/2011 | Nuspl et al. |
| 8,048,565 B2 | 11/2011 | Gauthier et al. |
| 8,053,075 B2 | 11/2011 | Schall et al. |
| 8,114,469 B2 | 2/2012 | Zaghib et al. |
| 8,133,618 B2 | 3/2012 | Gauthier et al. |
| 8,173,049 B2 | 5/2012 | Ravet et al. |
| 8,257,616 B2 | 9/2012 | Ravet et al. |
| 8,273,481 B2 | 9/2012 | Gauthier et al. |
| 8,506,851 B2 | 8/2013 | Ravet et al. |
| 8,506,852 B2 | 8/2013 | Ravet et al. |

(Continued)

FOREIGN PATENT DOCUMENTS

| CA | 2320661 | 3/2002 |
| --- | --- | --- |
| CN | 1526645 A | 9/2004 |

(Continued)

OTHER PUBLICATIONS

Preparation and characterization of highly dispersed nanocrystalline rutile powders, Liu et al, Materials Letters 61, 2007, 2798-2803.*
Nanoparticle iron-phosphate anode material for Li-ion battery, Son et al, Applied Physics Letters, 85, 2005, 5875-5877.*

(Continued)

*Primary Examiner* — Khanh Tuan Nguyen
*Assistant Examiner* — Haidung Nguyen
(74) *Attorney, Agent, or Firm* — RatnerPrestia

(57) ABSTRACT

The present invention relates to a nanoparticulate composition comprising nanoparticles with a particle-size distribution of $d_{90} \leq 10$ μm, and optionally a surface-active agent.

The present invention further relates to a method for the production of such a nanoparticulate composition.

5 Claims, 7 Drawing Sheets

(56) References Cited

U.S. PATENT DOCUMENTS

| | | | |
|---|---|---|---|
| 8,647,778 | B2 | 2/2014 | Gauthier et al. |
| 2002/0192137 | A1 | 12/2002 | Chaloner-Gill et al. |
| 2003/0082454 | A1 | 5/2003 | Armand et al. |
| 2004/0033360 | A1 | 2/2004 | Armand et al. |
| 2004/0086445 | A1 | 5/2004 | Armand et al. |
| 2004/0202934 | A1 | 10/2004 | Zaghib et al. |
| 2004/0242729 | A1* | 12/2004 | Baran et al. ............ 523/200 |
| 2007/0134554 | A1 | 6/2007 | Armand et al. |
| 2007/0240604 | A1* | 10/2007 | Inbe et al. ............ 106/1.12 |
| 2007/0243467 | A1 | 10/2007 | Zaghib et al. |
| 2008/0280141 | A1* | 11/2008 | Dobbs et al. ............ 428/403 |
| 2010/0065787 | A1 | 3/2010 | Armand et al. |
| 2010/0144518 | A1* | 6/2010 | Scott et al. ............ 502/171 |
| 2012/0135311 | A1 | 5/2012 | Zaghib et al. |
| 2013/0302673 | A1 | 11/2013 | Ravet et al. |
| 2014/0141333 | A1 | 5/2014 | Gauthier et al. |

FOREIGN PATENT DOCUMENTS

| | | | |
|---|---|---|---|
| CN | 1622368 A | | 6/2005 |
| DE | 10223567 A1 | | 12/2003 |
| DE | 10 2005 015 613 A1 | | 10/2006 |
| EP | 260 664 A2 | | 3/1988 |
| EP | 904 607 B1 | | 3/1999 |
| EP | 1 049 182 A2 | | 11/2000 |
| EP | 1 553 647 A1 | | 7/2005 |
| EP | 1 630 136 A1 | | 3/2006 |
| JP | 2004-079276 A | | 3/2004 |
| JP | 2007-511458 A | | 5/2007 |
| JP | 2007-515762 A | | 6/2007 |
| WO | WO 02/27823 A1 | | 4/2002 |
| WO | WO 02/27824 A1 | | 4/2002 |
| WO | WO 02/46101 A2 | | 6/2002 |
| WO | WO 2004/005184 A1 | | 1/2004 |
| WO | WO 2005/051840 A1 | | 6/2005 |
| WO | WO 2006/105848 A2 | | 10/2006 |
| WO | WO/2006/116251 A2 | | 11/2006 |
| WO | WO 2007/000251 A1 | | 1/2007 |
| WO | WO 2007/020985 A1 | | 2/2007 |
| WO | WO 2008/140506 | * | 11/2008 |

OTHER PUBLICATIONS

Structure and electrochemistry of FePO4.2H2O hydrate, Zaghib et al, Journal of Power Sources, 142, 2005, pp. 279-284.*

International Search Report, dated Jul. 7, 2009.

Su, Yue-Fey et al., "Preparation of $Li_4Ti_5O_{12}$ from Nanocrystalline $TiO_2$ and its Lithiation Performance," Acta Physico-Chimica Sinica 20(7):707-11 (2004), with English abstract.

Jiang, Chunhai et a., "Effect of Particle Dispersion on High Rate Performance of Nano-Sized $Li_4Ti_5O_{12}$ Anode," Electrochimica Acta 52(23): 6470-75 (2007).

Zhang, Jin-ling et al., "Study on synthesis of Fe3(PO4)2 by solid state reaction and its influencing factors," Chemical Abstracts Service Database Accession No. 147:192805 (2006).

Taiwanese Office Action mailed Jan. 27, 2014 for corresponding Taiwanese Application No. 097147042 (with partial translation).

Liu, Zhao-Tie et al., "Preparation and Characterization of Highly Dispersed Nanocrystalline Rutile Powders," Materials Letters 61(13): 2798-803 (2006).

Solberg, Daniel et al., "Adsorption and flocculation behavior of cationic polyacrylamide and colloidal silica," Colloids and Surfaces A: Physiochem. Eng. Aspects 219:161-72 (2003).

Schlogl, Robert, et al., "Nanocatalysis: Mature Science Revisited or Something Really New?," Angewandte Chemie, 43, 2004, pp. 1628-1637.

Cf. e.g. Paschen et al., "TA-Projekt Nanotechnologie," 2003, pp. 1-452.

Reale, Priscilla et al., "Synthesis and Thermal Behavior of Crystalline Hydrated Iron (III) Phosphates of Interest as Positive Electrodes in Li Batteries," Chem. Matter., vol. 15 No. 26, 2003, pp. 5051-5058.

Dina Fattakova et al., "Solvothermal Synthesis of Electrochemically Active Nanocrystalline Li—Ti—O Spinel," Mat. Res. Soc. Symp. Proc., vol. 703, 2002, Materials Research Society.

Dongyeon Son et al., "Nanoparticle Iron-Phosphate Anode Material for Li-Ion Battery," Applied Physics Letters, vol. 85, No. 24, Dec. 13, 2004, pp. 5875-5877.

Genji Jimbo et al., Fineparticle Handbook, Asakura Shoten, Sep. 1, 1991, pp. 342-343, ISBN—10: 4254200498.

Japanese Office Action for Application No. 2013-106527 dated Oct. 28, 2014.

* cited by examiner

NANOPARTICULATE COMPOSITION AND METHOD FOR ITS PRODUCTION

CROSS REFERENCE TO RELATED APPLICATIONS

This is a National Phase application of PCT application number PCT/EP2008/010399, filed Dec. 8, 2008, which claims priority benefit of German application number DE 10 2007 058 674.6, filed Dec. 6, 2007, the content of such applications being incorporated herein by reference.

FIELD OF THE INVENTION

The present invention relates to a nanoparticulate composition and methods for the production of same. The present invention also relates to the use of such nanoparticulate compositions for the production of battery materials.

BACKGROUND OF THE INVENTION

Nanoparticles, i.e. solids produced as powder or dispersed in liquid media, the individual particles of which extend typically less than 1000 nm in at least two dimensions and which are composed of chemical elements, inorganic or organic compounds or composites, have been used for several years for many applications.

For example, nanoparticles are used as catalyst starting substances, as nanoparticles often have a high BET surface area.

Typically, in what is called the wet-chemical synthesis of nanocrystalline powders or nanoparticles starting from so-called precursor compounds, a powder is synthesized by chemical reactions for example by means of precipitations or by the hydrolysis of organometallic compounds. The final structure of the nanoparticles is usually not obtained until after or during a subsequent calcination following the precipitation.

The targeted control of the crystallization process can be influenced by the composition of the educt(s). An important factor here—in particular when used in the catalysis of such nanoparticles—is the crystallite size (R. Schlögel et al., Angewandte Chemie 116, 1628-1637, 2004). However, it has hitherto been almost impossible, by means of wet-chemical production methods, in particular by means of the so-called basic hydroxide precipitation, to accordingly optimize the precipitation method in respect of the desired nanoparticles and their properties, in particular their average particle-size distribution.

Mechanical production methods for the synthesis of nanoparticles have therefore also been considered. This is carried out for example by intensive grinding of inhomogeneous particles to homogeneous particles, which however often also leads to undesired phase transformations to the point where particles become amorphous due to the pressure exerted on the particles.

However, the particles formed in the process are not present in a uniform homogeneous size distribution, because the very small particles formed display a marked tendency to reagglomerate.

Further access to nanoparticles is via thermophysical methods as disclosed for example in WO 2004/005184. These are typically based on the introduction of thermal energy into solid, liquid or gaseous starting compounds. Here, the so-called plasmapyrolytic spraying process (PSP) of the above-named WO 2004/005184 in which the starting substances are sprayed in an oxyhydrogen flame and decomposed is particularly widely used. A typical application for the PSP process is in the production of nanocrystalline silicon dioxide in which readily volatile organosilicon compounds are sprayed in an oxyhydrogen flame.

Furthermore, in the synthesis of nanoparticles the so-called plasma synthesis method is often used in which the starting substances are evaporated in a plasma up to 6,000 K in temperature. Further methods known from the state of the art are for example CVD methods in which gaseous educts are reacted, wherein typically non-oxidic powders and mixed oxidic compounds with different phase structures also form.

Nanoparticulate compositions are also widely used for example in the production of electrode materials for secondary batteries as described for example in EP 1 553 647 A1. In this patent application, in particular the production of lithium iron phosphate is described, wherein the material forms mostly aggregates>1 μm in size. Particles that are as finely dispersed as possible are also be desirable in particular for use as cathode material.

Similar problems result in the production, disclosed in US 2002/0192137, of nanoscale and submicron particles in a flow reactor by means of laser irradiation, wherein complex oxides such as for example lithium phosphorus oxide nitride, lithium iron manganese phosphate, calcium phosphate, aluminium phosphate etc. also form. According to US 2002/0192137, these nanoparticles are likewise used as material for battery applications. A production of in particular lithium iron phosphates by the aqueous route in order to obtain nanoparticles is disclosed in WO 2006/116251, but in the case of lithium iron phosphate a precipitation by means of hydroxide is advised against and the so-called carbonate precipitation is recommended for the starting materials.

The production of lithium iron phosphate ($LiFePO_4$) is known in particular from U.S. Pat. No. 5,910,382 by Goodenough et al. This material is currently the most promising material for use in secondary lithium ion batteries. Furthermore, WO 02/27823 and WO 02/27824 describe the production of $LiFePO_4$ starting from iron phosphate by reaction with lithium carbonate in the presence of a carbon monoxide atmosphere.

DESCRIPTION OF THE INVENTION

An object of the present invention was therefore to provide extremely finely dispersed nanoparticulate compositions which do not form agglomerates or larger agglutinations. The term "nanoparticulate" usually describes particles with an average particle size of ≤500 nm, while a size range of from 1-100 nm is mostly given for nanoparticles (cf. e.g. Paschen, H., Coenen, C., Fleischer, T., Grünwald, R., Oertel, D., Revermann, C.; Nanotechnologie—Forschung, Entwicklung, Anwendung; Springer-Verlag; Berlin, Heidelberg, New York 2004).

This problem is solved according to aspects of the invention by a nanoparticulate composition which comprises non-aggregated nanoparticles, isolated from one another, of a transition metal compound with a particle-size distribution of $d_{90} \leq 10$ μm, quite particularly preferably $d_{90} \leq 5$ μm. According to aspects of the invention, the transition metal compound is both a pure ("binary") transition metal compound, i.e. composed of a single anion or cation, and a mixed ("polynary") or "doped" transition metal compound which can have several transition metal cations and/or anions.

The term "non-aggregated" means according to aspects of the invention that no particles which consist of several individual particles, i.e. which form so-called agglomerates ("secondary particles") and have a particle size of more than 15 µm, are present in the nanoparticulate composition. In other words, the composition according to aspects of the invention therefore consists only of so-called primary particles.

The particle-size distribution of the composition according to aspects of the invention is preferably monomodal and quite particularly preferably the $d_{50}$ value of the nanoparticles according to aspects of the invention is 0.2 to 1 µm. It was surprisingly found that the nanoparticulate composition comprises almost exclusively finely-crystalline nanoparticles and no amorphous particles are present.

The nanoparticulate composition preferably comprises a material which is selected from oxides, phosphates and sulphates of chromium, titanium, iron, nickel, molybdenum, tungsten, zirconium, hafnium, tantalum, niobium, cerium and vanadium or mixtures thereof. Iron phosphates such as $FePO_4 \cdot 2H_2O$ (iron(III)phosphate) or $Fe_3(PO_4)_2$ (iron(II) phosphate), titanium dioxide ($TiO_2$), $Li_4Ti_5O_{12}$ and $LiFePO_4$ and their doped compounds may be named as particularly preferred non-limiting specific examples.

Iron(III)phosphate is already long-known. For example, a production method is described in GB 962 182. However, the iron(III)phosphate of the state of the art ($FePO_4 \cdot 2H_2O$) has at best an average particle size $d_{50}$ of from approx. 10 to 20 µm. To date, smaller particle sizes have been unobtainable or obtainable only with difficulty due to the production methods and the high levels of contamination with sulphates.

The size distribution of the nanoparticles according to aspects of the invention in particular from the abovenamed materials is monomodal in quite particularly preferred specific embodiments. In particular the $FePO_4$ and $Fe_3(PO_4)_2$ particles have a quite particularly preferred average particle-size distribution $d_{50}$ of from 0.3 to 0.8 µm, more preferably 0.4 to 0.7 µm, which is well below the particle-size distributions $d_{50}$ of all previously known iron(III) and iron(II)phosphates of the state of the art.

Unlike the sulphate-containing iron(III)phosphates mostly used to date, which is almost inevitable due to the use of iron sulphate as starting material, the particulate composition according to aspects of the invention comprising $FePO_4 \cdot 2H_2O$ is almost sulphate-free. "Almost" means here that, using currently customary analysis methods, no sulphate can be detected within the limits of measurement accuracy.

A further important aspect of the present composition according to aspects of the invention comprising $FePO_4 \cdot 2H_2O$ or $Fe_3(PO_4)_2$, $TiO_2$ or $LiFeO_4$ is that, as stated above, the particles of this composition are finely crystalline and are not present in an amorphous state or have no amorphous particles whatever, as typically occurs in most other nanoparticulate $FePO_4$ or $Fe_3(PO_4)_2$ and $TiO_2$ or $LiFePO_4$ compounds of the state of the art.

In an advantageous development of the present invention, the composition according to aspects of the invention also comprises a surface-active agent.

Surprisingly, it was found that the presence of the surface-active agent leads to the individual nanoparticles in the composition remaining separated from one another, i.e. isolated after the final drying, whereby the composition according to aspects of the invention can therefore be used as particularly finely particulate powder which does not aggregate and agglomerate, not even under typical agglomeration conditions such as increased ambient moisture etc. This affects in particular nanoparticles based on metal or transition-metal phosphates, oxides, carbonates and sulphates.

The surface-active agent is preferably ionic in character, wherein, depending on the chemical structure and property of the nanoparticles, the ionic character of the surface-active agent can vary from cationic to anionic.

It was furthermore found that the surface-active agent can be present in a quantity of 0.01 to 2 wt.-% relative to the overall mass of the composition. Below 0.01 wt.-% it is no longer guaranteed that the nanoparticles remain separated from one another and do not aggregate or agglomerate. Above 2 wt.-% agglomerates likewise form as a result of the increasing quantity of surface-active agents. However, preferably no more than 1 wt.-% should be present, as otherwise filtration is made difficult.

The surface-active agent, in particular in the case of compositions according to aspects of the invention comprising $TiO_2$, $Fe_3(PO_4)_2$, $LiFePO_4$ and $FePO_4$, preferably has a weakly cationic character, as have for example the surface-active agents of the Praestol flocculant series from Stockhausen GmbH & Co.

It proved advantageous that the surface-active agent with weakly cationic character is comprised in a quantity of 0.01 to 1 wt.-% relative to the weight of the overall composition, wherein finely-dispersed crystallites of the corresponding material, in particular $TiO_2$, $LiFePO_4$, $Fe_3(PO_4)_2$ and $FePO_4 \cdot 2H_2O$ are then present. Above 1 wt.-% of the surface-active agent, a simple filtration of the product in the method according to aspects of the invention described below is no longer possible and almost exclusively agglutinated agglomerates are obtained.

In the production of $TiO_2$ by hydrolysis of Ti(IV) compounds, it was also already known to add cationic polyelectrolytes (EP 260 664 A2), however quantities of more than 4, even more preferably of more than 5.5 wt.-% relative to the weight of the overall composition were required. The small quantities of surface-active agents used according to aspects of the invention are unprecedented.

Furthermore, an object of the invention is achieved by a method for the production of a nanoparticulate composition as defined above, wherein the nanoparticles are precipitated in solution and a surface-active agent is added after the precipitation of the nanoparticles.

This method for the production of a nanoparticulate composition comprising an oxide, carbonate, sulphate or phosphate of a transition metal includes the steps of a) providing an acid aqueous solution of a transition metal starting compound;

$b_1$) optionally, adding an alkali hydroxide solution;

$b_2$) adding an acid with a suitable anion;

c) adding a surface-active agent after the start of the precipitation of the precipitate;

d) filtering the precipitated nanoparticulate composition.

By "alkali hydroxide" is meant according to aspects of the invention KOH or NaOH solutions.

The term "suitable anion" means that the anion forms a precipitate insoluble in the solvent used with the transition metal starting compound.

For example, in the production of nanoparticulate $TiO_2$ only a hydrolysis with water is required which thus in other words functions as "acid".

Step $b_1$) is optional because, as e.g. in the case of $TiO_2$ addition of a base is not necessary because $TiO_2$ already forms through hydrolysis.

The nanoparticles obtained by means of the method according to aspects of the invention precipitate as binary or polynary compounds, with the result that an almost unlimited number of compounds can be produced by means of the method according to aspects of the invention.

At least one, preferably the first step a) (the other steps then take place at room temperature), more preferably all steps a)

to c) of the method steps are carried out at a temperature in the range of from 60-170° C., preferably 60-150° C., most preferably 60-110° C.

The addition of the surface-active agent in step c) is typically carried out after the start of the precipitation of the precipitate, quite preferably after the end of the precipitation and leads to a clearly recognizable flocculation of the precipitate which before the addition had the form of an extremely finely dispersed suspension. As a result of the flocculation, an easy filtration is possible according to aspects of the invention via filter media customary in the trade without e.g. centrifuges etc. having to be used.

Following the filtration, the nanoparticulate composition can still be dried at temperatures of ≤250° C.

The starting compounds of the binary or polynary nanoparticles are preferably used in water-soluble form in order to guarantee an exact stoichiometry and ease of handling.

It was surprisingly found that, as a result of the method according to aspects of the invention, in particular the addition of a surface-active agent after the start of the precipitation, finely-crystalline, isolated, non-agglomerated nanoparticles with particle diameters of 0.3 to 0.8 μm, quite particularly 0.4 to 0.7 μm, are obtained, which was not to be expected on the basis of the hydroxide precipitation route used here. This is true in particular for example for $FePO_4.2H_2O$, $Fe_3(PO_4)_2$, $LiFePO_4$ and $TiO_2$. The term "after the start of the precipitation" also includes according to aspects of the invention the time that the addition, as already explained above, takes place after the end of the precipitation process.

It was known e.g. in the case of $FePO_4.2H_2O$ (P. Reale and B. Scrosati Chem. Mater. 5051 2003) that iron phosphate can be obtained starting from $FeCl_3$ with $H_3PO_4$ at a starting concentration of 0.009 mol/l $FeCl_3.H_2O$ and 0.0027 mol/l $H_3PO_4$, wherein three structurally different phases with the chemical formula $FePO_4.2H_2O$ form, namely strengite, metastrengite I and metastrengite II, which precipitate at different pHs.

According to this citation, strengite forms when 0.04 molar NaOH (pH=3-4) is added, metastrengite I without further addition (pH=1-2) and metastrengite II when 0.5 molar HCl (pH=0-1) is added. The reaction times to reach the pure phases increase from strengite at two days via metastrengite I at 7 days to metastrengite II at 12 days. The authors furthermore also describe mixed phases under strongly acid conditions (pH=0-1) and a shorter reaction time than 12 days. The strengite phase also occurs as a natural mineral with the same name, metastrengite II can be equated with the naturally occurring mineral phosphosiderite. Metastrengite I is described neither as natural nor as synthetic phase.

Problems result in particular because of the poor filterability of the product and as a result of the different phases described in the state of the art.

Unlike the abovementioned results of Reale and Scrosati, it was surprisingly not observed with the method according to aspects of the invention that strengite $FePO_4$ forms first and metastrengite I and metastrengite II phases after a longer reaction time.

With the method according to aspects of the invention, the metastrengite I phase typically forms immediately.

In a preferred embodiment in which the $FeCl_3$ solution, preferably also the NaOH or KOH solution, is heated to a temperature of from 60 to 170° C., more preferably 60 to 150° C., most preferably 60-110° C. and the $FeCl_3$ solution has a concentration of 30 to 50%, the method according to aspects of the invention, in the case of the production of $FePO_4.2H_2O$ starting from iron(III)chloride, NaOH or KOH and phosphoric acid, displays a high yield of more than 90%, wherein an extremely finely-dispersed crystalline material of primary particles without agglomerates (secondary particles) or aggregates forms.

The disadvantage when using iron(III)chloride is that the educt has a high chloride content, as chlorides have a strong corrosive effect both in production and in later uses. During production, typically no customary metal containers can be used, with the result that for example at least the inside must be given an acid-resistant coating. Furthermore, it was previously believed that the obtained material must be washed vigorously in order to obtain a low chloride concentration of the product.

In the state of the art, the use of caustic soda solution or caustic potash solution as precipitant was previously advised against in the synthesis of transition metal compounds, as non-filterable products form and the obtained raw product is strongly agglomerated above certain concentrations of caustic soda or caustic potash solution.

According to aspects of the invention, the nanocrystalline iron(III)phosphate with the particle-size distribution according to aspects of the invention is obtained in particular when, through addition of the caustic soda or caustic potash solution to the iron(III)chloride solution, iron(III)hydroxide is precipitated as an intermediate product in the heat in the reaction solution, and then reacts further with phosphoric acid to iron (III)phosphate. Without intermediate precipitation of iron(III)hydroxide, too few condensation nuclei form, which results in the formation of larger particles.

NaOH or KOH solution is preferably used in a concentration of approx. 2 mol per mol Fe, which leads to better results in the intermediate precipitation of iron hydroxide.

The $FePO_4.2H_2O$ or $Fe_3(PO_4)_2$ obtained by means of the method according to aspects of the invention is particularly well suited to use in the production of lithium iron phosphate or mixed (doped) lithium iron transition metal phosphates e.g. in solid-state methods known from the state of the art and also in so-called hydrothermal methods likewise largely known from the state of the art.

Furthermore, an object of the present invention is achieved with a method for the production of nanoparticulate $LiFePO_4$ comprising the reaction of
  a) a nanoparticulate composition according to aspects of the invention comprising $FePO_4.2H_2O$ with
  b) a stoichiometric quantity of a lithium compound selected from LiOH, $Li_2O$, lithium acetate, lithium oxalate or $Li_2CO_3$
under pyrolytic conditions, i.e. in a solid-state reaction, wherein in preferred developments additionally a transition metal compound is added, wherein the transition metal M is selected from Co, Ti, Ni, V, W, Pd, Ru, Cu, Mn, Ba, Sr, Nd, Mg. Typical compounds are their phosphates, carbonates, oxalates, nitrates, acetates, hydroxides, carboxylates or oxides. Thus the corresponding doped lithium iron phosphates $LiFe_{1-x}M_xPO_4$ with x<1 can be obtained, wherein M can also be a mixture of several of the abovenamed transition metals, as described e.g. in EP 1,325,525 A1, EP 904 607 B1, US2003/0082454, reference to the full disclosure content of which is made here.

According to aspects of the invention, the method for the production of undoped and doped lithium ion phosphate can also be carried out hydrothermally, i.e. in solution, typically in aqueous solution, in which
  a) a nanoparticulate composition according to aspects of the invention comprising $Fe_3(PO_4)_2$. is hydrothermally reacted with b) a stoichiometric quantity of a lithium compound selected from LiOH, $Li_2O$, lithium acetate, lithium oxalate or $Li_2CO_3$ as well as a phosphate source.

By adding a water-soluble transition metal compound, wherein the transition metal M is selected from Co, Ti, Ni, V, W, Pd, Ru, Cu, Mn, Ba, Sr, Nd, Mg, the corresponding doped lithium iron phosphates $LiFe_{1-x}M_xPO_4$ with $x<1$ can also be obtained on this synthesis route, wherein M can also be a mixture of several of the abovenamed transition metals. Typical soluble compounds include, but are not limited to, the nitrates, acetates, chlorides, carboxylates, bromides, sulphates, hydroxides, phosphates of the abovenamed transition metals (see e.g. WO 2005/051840 A1). For example, phosphoric acid (in particular for the production of undoped $LiFePO_4$) or also the corresponding phosphates of the mixed doping metal(s) serve as phosphate source according to aspects of the invention.

It is advantageous if the method steps a) to c) in the hydrothermal method are carried out at a temperature of from 60° C. to 170° C., particular preferably of from 100° C. to 150° C., as the total yield of the precipitation or reaction increases compared with when operating at room temperature.

Likewise, according to aspects of the invention, $Li_4Ti_5O_{12}$ can be produced both pyrolytically and also hydrothermally, wherein a lithium compound, selected from LiOH, $Li_2O$, lithium acetate, lithium oxalate or $Li_2CO_3$ is reacted in a stoichiometric quantity with a nanoparticulate composition according to aspects of the invention comprising $TiO_2$ at a temperature in the range of from 500-750° C. in a hydrothermal process.

It was surprisingly found that the nanoparticulate properties of the composition obtained according to aspects of the invention comprising e.g. $FePO_4.2H_2O$, $Fe_3(PO)_2$ and $TiO_2$ are retained even after calcination of the composition according to aspects of the invention in the $LiFePO_4$ or $Li_4Ti_5O_{12}$ produced by means of these calcined products in the method according to aspects of the invention as well as in their doped derivatives, with the result that in the case of the starting compound the addition of a surface-active agent already has a positive effect on the agglomeration behaviour even during the subsequent synthesis of e.g. $LiFePO_4$ or $Li_4Ti_5O_{12}$ or their doped derivatives. In other words extremely finely-dispersed nanoparticulate, crystalline pure or doped $LiFePO_4$ or $Li_4Ti_5O_{12}$ is obtained starting from $FePO_4$, $Fe_3(PO_4)_2$ or $TiO_2$ precipitated with a surface-active agent according to aspects of the invention.

According to aspects of the invention, extremely finely-dispersed materials can thus be obtained which retain their fine dispersion even after further reaction or transfer this to the product obtained by further reaction.

In preferred embodiments, the synthesis is carried out in the presence of an additional carbon source, as described e.g. in EP 1 049 182 A1, reference to the full disclosure content of which is made here.

In quite particularly preferred embodiments, the surface-active agent which is already comprised in a preferred composition according to aspects of the invention (which has not been calcined) is used as carbon source, with the result that the addition of a further carbon source can advantageously be dispensed with. Further access to carbon-coated nanoparticles, for example $LiFePO_4$, $Li_4Ti_5O_{12}$ or their doped derivatives, is thereby provided.

BRIEF DESCRIPTION OF THE FIGURES

The invention is described in more detail below with reference to drawings and embodiment examples which are not, however, to be considered limiting.

There are shown in.

DETAILED DESCRIPTION OF THE PREFERRED EMBODIMENT

Figure 1:
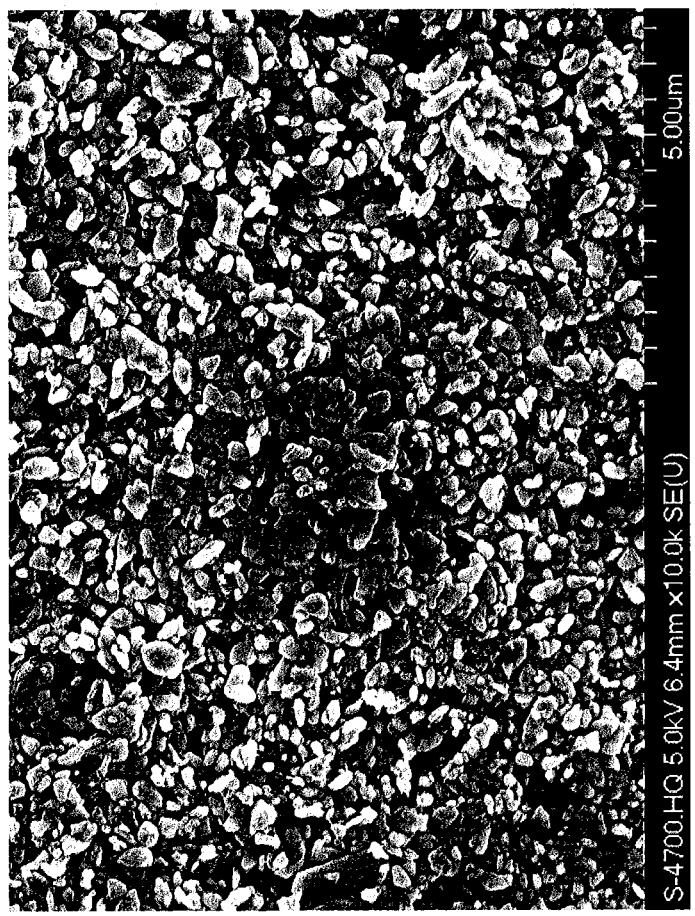
FIG. 1 an SEM photo of $LiFePO_4$ which was obtained with the composition according to aspects of the invention comprising iron phosphate.

FIG. 1 shows an SEM photo of $LiFePO_4$ (sample number ALEP 46_3) which was produced from nanoparticulate $FePO_4$ obtained according to aspects of the invention analogously to the method described in CA 2320661 according to Example 2 below and displays clearly finely-crystalline discrete particles as well as the starting substance $FePO_4.2H_2O$. The fine crystallinity of $FePO_4$ was thus "transferred" to $LiFePO_4$.

Figure 2:
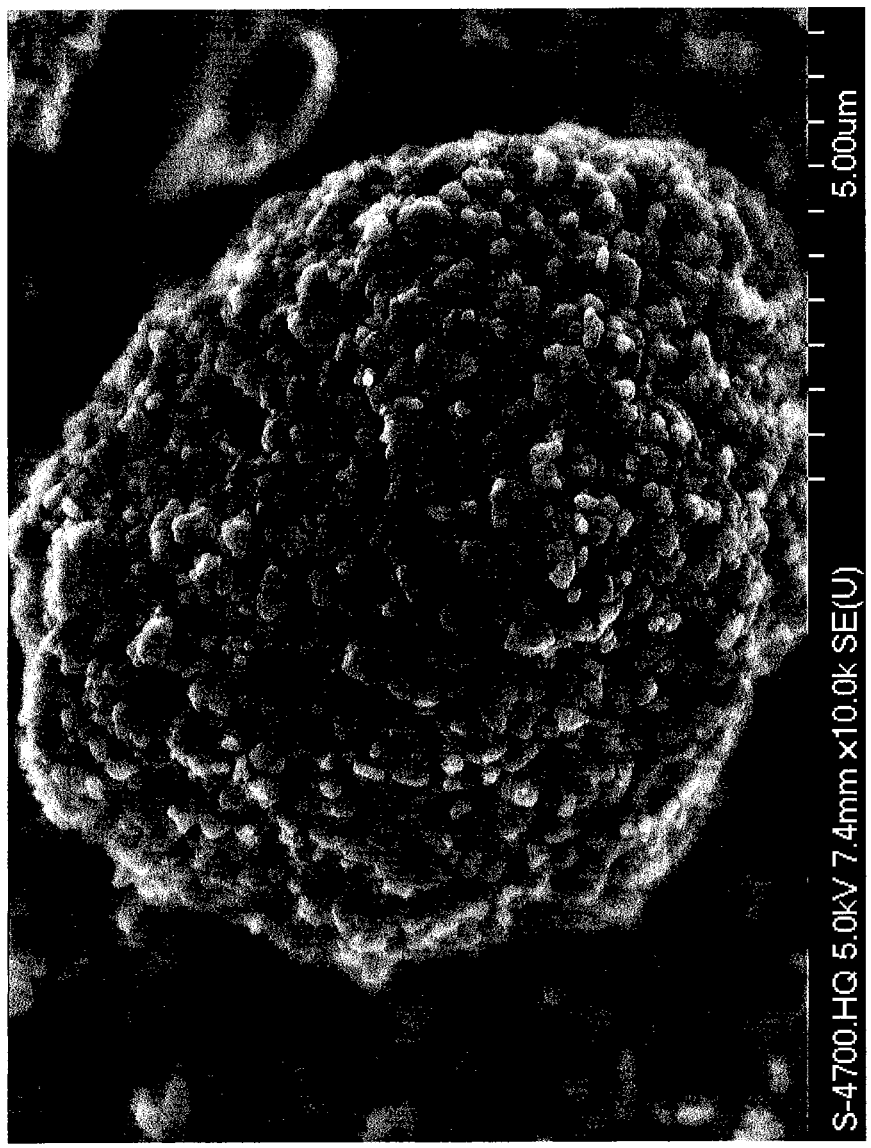
FIG. 2 an SEM photo of $LiFePO_4$ which was obtained according to the state of the art from $FePO_4$ without the addition of a surface-active agent.

FIG. 2 shows $LiFePO_4$ (sample ALEP 46_1) which was obtained starting from $FePO_4.2H_2O$ as in FIG. 1, in which no surface-active agent was added during the production, and clearly shows an agglomeration of the particles (unlike the finely-crystalline, discrete particles in FIG. 1) to larger aggregates.

Figure 3:
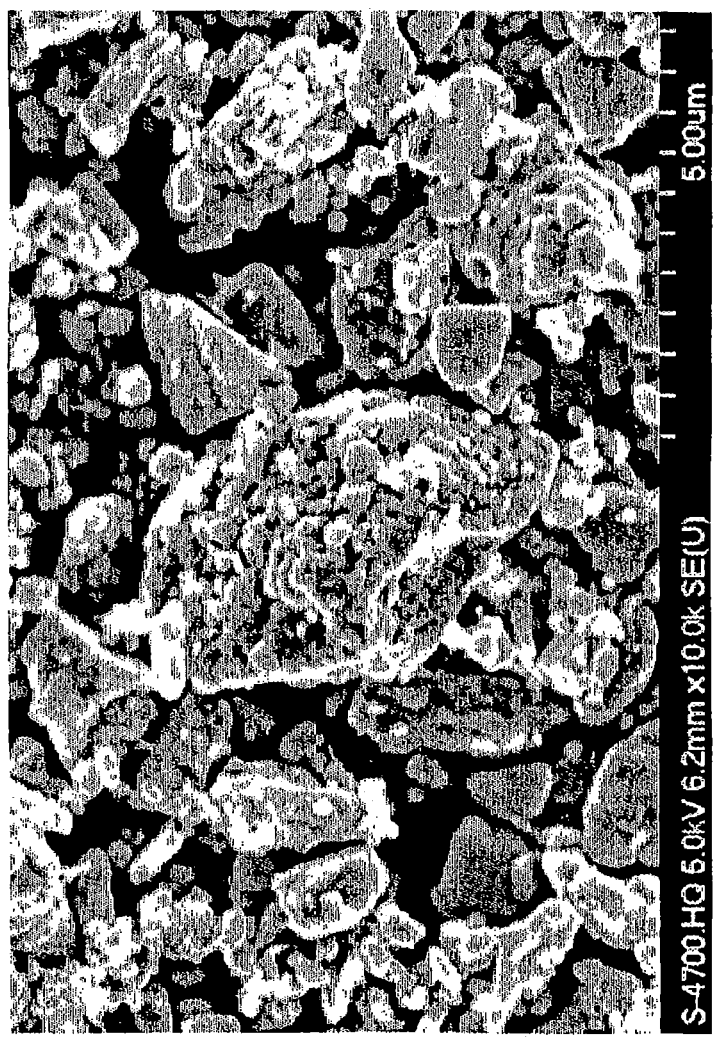
FIG. 3 an SEM photo of $LiFePO_4$ which was obtained starting from $FePO_4.2H_2O$.

FIG. 3 shows an $LiFePO_4$ produced according to the same method from commercially available $FePO_4.2H_2O$ (Budenheim), which, compared with FIG. 1 and FIG. 2, displays in particular much larger, coarser individual particles.

Figure 4:
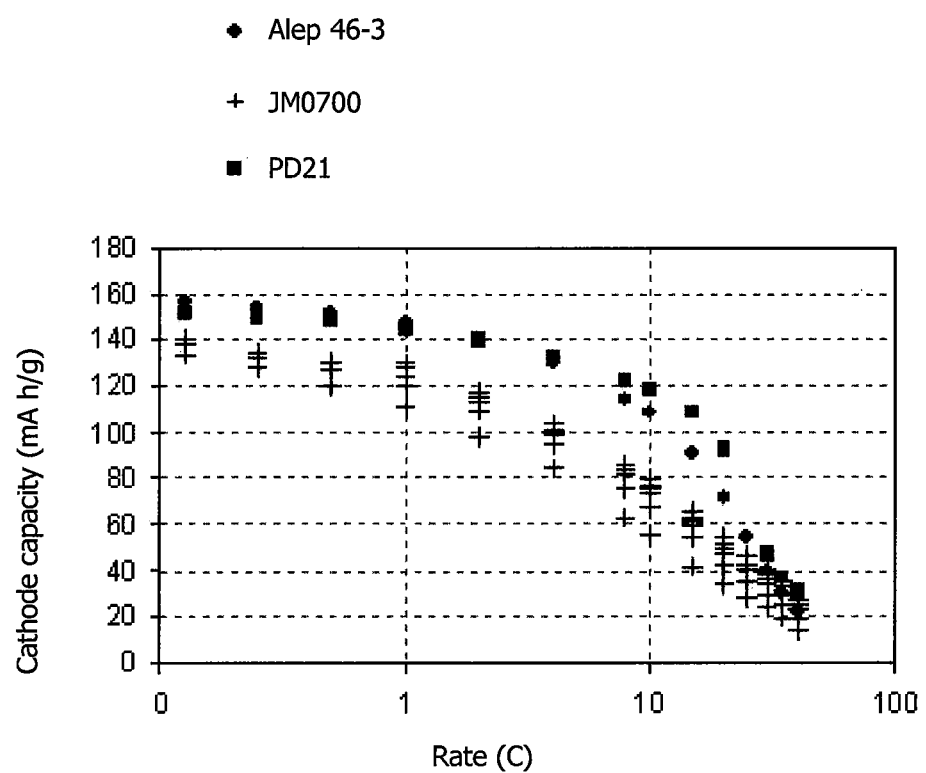
FIG. 4 in a diagram the loadability and capacity of $LiFePO_4$ obtainable from various starting materials.

FIG. 4 shows the loadability and capacity of $LiFePO_4$ produced according to Example 2, which was obtained starting from various $FePO_4.2H_2O$ starting materials.

There it is can be seen that the particle size of the particles has a marked effect on the loadability and capacity of the samples.

The $LiFePO_4$ sample (Alep 46_3) produced from $FePO_4.2H_2O$ produced according to aspects of the invention has a higher capacity than the sample from FIG. 3 (JM0700) which was obtained from commercially available $FePO_4.2H_2O$ from Budenheim.

$LiFePO_4$ produced hydrothermally according to WO 2005/051840 A1 (available from Sud-Chemie AG) (PD21) is comparable. The sample Alep 46_3 displays a somewhat poorer capacity PD 21 only from 8C.

Figure 5:
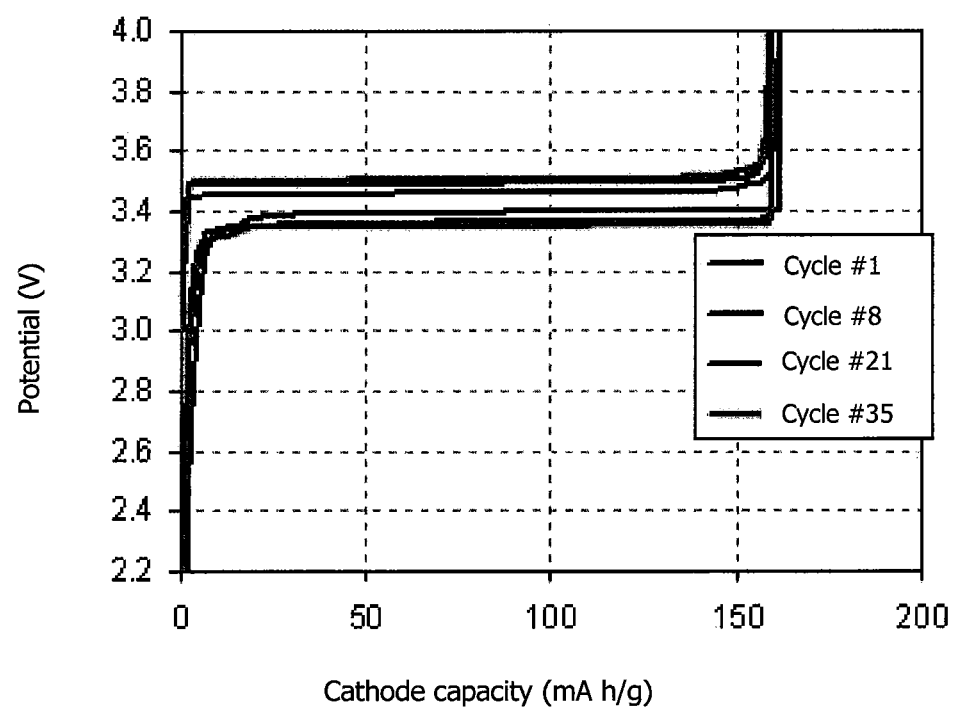
FIG. 5 in a diagram the voltage characteristic when charging and discharging the first 35 cycles of $LiFePO_4$ with $FePO_4.2H_2O$ obtained according to aspects of the invention as precursor.

It can also be seen in FIG. 5 that $LiFePO_4$, which was produced by means of $FePO_4.2H_2O$ obtained by the method according to aspects of the invention according to Example 2, has a good cycle stability with a flat plateau at approximately 3.5 volts. After 35 cycles, there is a decrease in capacity of approx. 4 to 3%. The starting capacity of the obtained $LiFePO_4$ sample was 98% of the theoretical.

Figure 6:
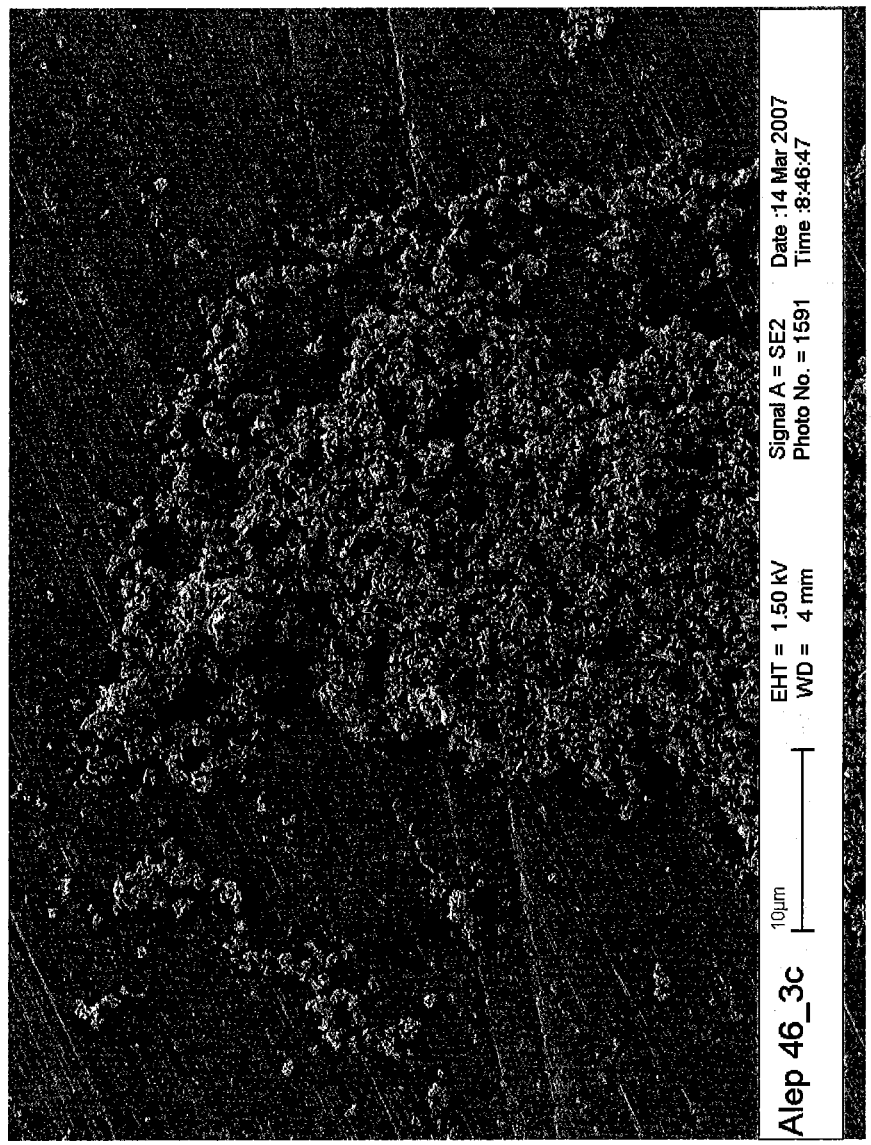
FIG. 6 an SEM photo of a composition according to aspects of the invention which comprises nanoparticulate $FePO_4.2H_2O$.
Figure 7:
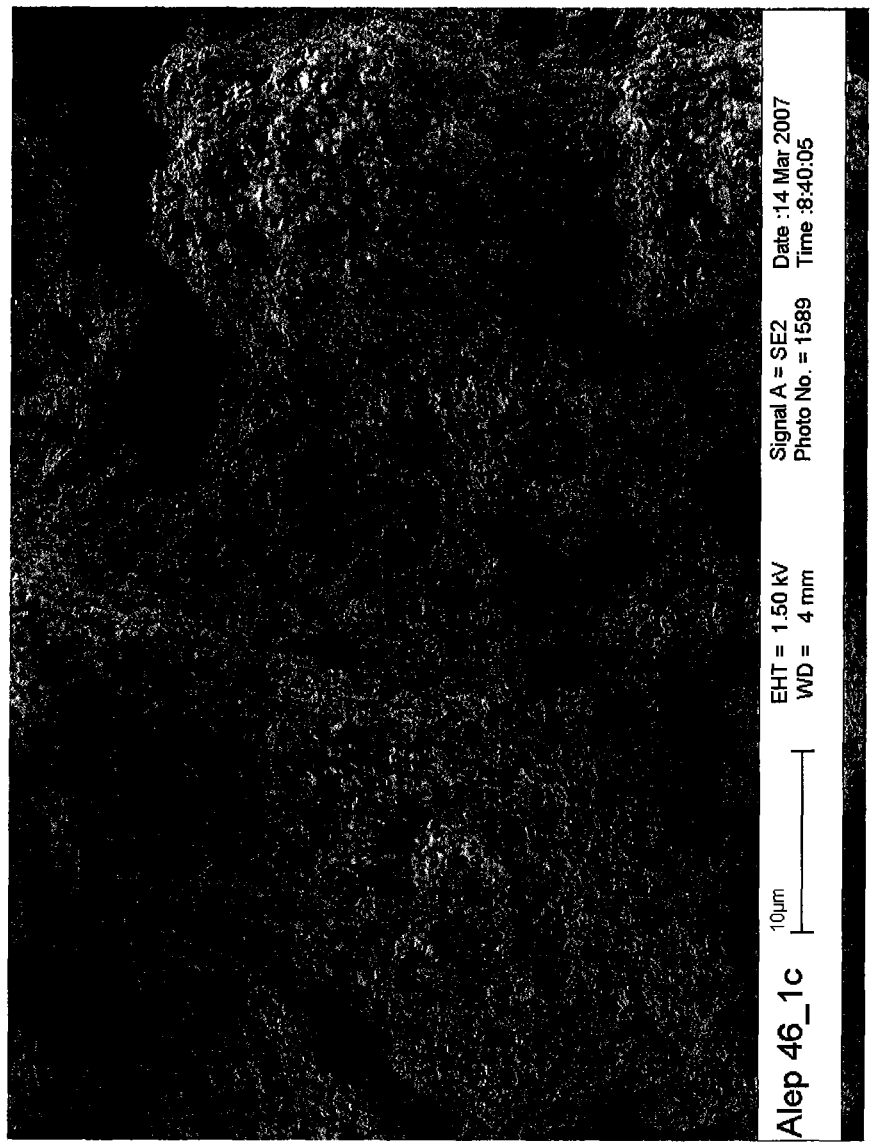
FIG. 7 an SEM photo of $FePO_4.2H_2O$ without the addition of a surface-active agent.

FIG. 7 shows an SEM photo of $FePO_4.2H_2O$ which was likewise obtained by means of hydroxide precipitation, but without the addition of a surface-active agent. Wholly unlike the FePO$_4$.2H$_2$O composition produced according to aspects of the invention according to FIG. 6, a marked agglomeration is to be observed, against which the composition according to aspects of the invention (0.05% surface-active agent) in FIG. 6 clearly displays finely-crystalline particles without agglomeration.

Example 1

Synthesis of FePO$_4$.2H$_2$O

The method according to aspects of the invention for the production of a nanoparticulate composition according to aspects of the invention is explained in more detail with reference to a synthesis of FePO$_4$.2H$_2$O.

The method was carried out in a hydrothermal reactor (Thale reactor, 200 l). The synthesis typically took place as follows:

146 kg 40% FeCl$_3$ solution (58.9 kg FeCl$_3$, i.e. 360 mol) was introduced into the reactor and a further 125 l water added. The mixture is then heated to a temperature of approx. 70° C.

56.2 kg 50% NaOH solution (28.1 kg NaOH, 702 mol) was then added accompanied by stirring, whereupon the temperature increased to approx. 95° C.

43.2 kg 80% H$_3$PO$_4$ (34.6 kg H$_3$PO$_4$, i.e. 353 mol) was then added immediately. The temperature remained at approx. 95° C. H$_3$PO$_4$ was used in a hypostoichiometric quantity of approx. 2% relative to FeCl$_3$.

The mixture was then heated to approx. 100° C. and stirred for 2½ hours. The temperature was kept at this value.

In this reaction, the iron concentration in the system was approximately 0.9 mol/l and the neutralization content was approximately 65% (1.95 mol NaOH per mol Fe).

After the stirring was ended, the solution and the formed yellow suspension were cooled to approx. 30° C., whereupon iron phosphate was obtained as a yellow suspension in a strongly acid solution.

A 0.2% aqueous solution of the weakly cationic surface-active agent Praestol 611 BC (Stockhausen GmbH & Co., Germany) was then added as follows to the cooled suspension:

The solution of the surface-active agent (0.05% surface-active agent relative to the dry mass of the iron phosphate dihydrate) was added slowly to the FePO$_4$.2H$_2$O suspension over a few minutes. The slightly viscous suspension was then filtered off and washed with ionized water until the conductivity of the washing water was less than 400 µS/cm.

The d$_{50}$ value was 0.4 µm. The material was finely crystalline without showing agglomerates (FIG. 6).

Example 2

Synthesis of LiFePO$_4$ (Pyrolytic Reaction)

LiFePO$_4$ was produced by reaction of the FePO$_4$.2H$_2$O and Li$_2$CO$_3$ obtained in Example 1 (available under the name Lithiumcarbonat Special PC/US 250 ACU from Pharma & Chemie GmbH) in the presence of hydrogen. In a first step, stoichiometric quantities of the two starting compounds were ground in isopropanol and then heated stepwise in an oven (6° C./minute to a temperature of 700° C.) under an atmosphere of 8% hydrogen in argon. This temperature was maintained for an hour. The obtained product was then cooled to room temperature within 40 minutes.

Throughout the thermal treatment and likewise during the reduction of the temperature, the gas flow of the reduction gas was retained. The total duration of the thermal treatment was approximately three and a half hours.

The structure of the obtained LiFePO$_4$ was determined by means of powder diffractometry and the obtained peaks of the spectrum corresponded to that of pure triphylite LiFePO$_4$.

The d$_{50}$ value was 0.5 µm. The material was finely crystalline without showing agglomerates (FIG. 1).

Example 3

Synthesis of LiFePO$_4$ with Carbon Coating

The LiFePO$_4$ obtained in Example 2 was impregnated with a solution of cellulose acetate (39.7 percent by weight acetyl content with an average molecular weight MW of 50,000) in acetone. The quantity of cellulose acetate was approx. 5 percent by weight relative to the LiFePO$_4$ to be treated. The acetone was drawn off and the obtained solid heated to 700° C. in a heating furnace under an argon atmosphere with a heating rate of 6° C./minute. This temperature is then maintained for an hour and the obtained product then gradually cooled to room temperature under a protective gas. The obtained sample contained 1 percent by weight carbon.

The electric conductivity of the obtained product was greater than 1×10$^{-8}$ S/cm.

The d$_{50}$ value was 0.6 µm. The material was finely crystalline without showing agglomerates.

Example 4

Synthesis of LiFePO$_4$ with Carbon Coating

LiFePO$_4$ coated with carbon was obtained from the FePO$_4$.2H$_2$O, Li$_2$CO$_3$ obtained in Example 1 (available under the name Lithiumcarbonat Special PC/US 250 ACU from Pharma & Chemie GmbH) and a carbon source. The carbon source was cellulose acetate as in Example 3 (39.7 percent by weight acetyl content, average molecular weight MW 50,000), wherein cellulose acetate was used in a quantity of 5 percent by weight relative to the quantity of FePO$_4$.2H$_2$O. Overall, the quantity of cellulose acetate was 4.2% relative to the weight of the mixture of FePO$_4$.2H$_2$O and Li$_2$CO$_3$. The mixture was stirred in isopropanol, the solvent removed and the mixture subjected to the thermal treatment specified in Examples 2 and 3.

The reductive atmosphere was composed of 8% hydrogen in argon.

The structure of the obtained product was determined by means of powder diffractometry and the reflexes correspond to those of pure LiFePO$_4$.

The produced sample is composed of very fine particles isolated from one another of the order of magnitude of 1 µm which are covered with a thin layer of carbon.

The electric conductivity of the obtained product was greater than 1×10$^{-8}$ S/cm.

The d$_{50}$ value was 0.6 µm. The material was finely crystalline without showing agglomerates.

Example 5

Synthesis of Carbon-Coated LiFePO$_4$

The FePO$_4$.2H$_2$O obtained from Example 1 was mixed in stoichiometric quantities with Li$_2$CO$_3$ (available under the name Lithiumcarbonat Special PC/US 250 ACU from Pharma & Chemie GmbH) as well as 5 percent by weight relative to the whole mixture of FePO$_4$ (2H$_2$O, Li$_2$CO$_3$ and a polymeric carbon source polyethylene-block-poly(ethylene glycol) (50% polyethylene) (Aldrich). This mixture was stirred in isopropanol and then put in the oven after drying and subjected to the thermal treatment described in Examples 2 and 3.

The electric conductivity of the obtained product was greater than $1 \times 10^{-8}$ S/cm.

The $d_{50}$ value was 0.5 µm. The material was finely crystalline without showing agglomerates.

Example 6

Electrochemical Measurements

Electrochemical measurements were carried out on the $LiFePO_4$ compound obtained according to aspects of the invention from Example 5.

The measurement of the capacity in the first cycle showed values of 95 to 97.5% of the theoretical capacity.

The $LiFePO_4$ obtained according to aspects of the invention has a very good cycle stability with a flat plateau at −3.5 V (FIG. 5).

After 35 cycles a fall of only approx. 2% in capacity could be measured.

Example 7

Synthesis of $TiO_2$ 13.2 ml $H_2SO_4$ (96%) and 11.2 ml $TiCl_4$ (98%) were added dropwise accompanied by stirring to 100.2 ml HCl (37%), in order to obtain a solution.

500 ml distilled $H_2O$ was then added, further distilled water added, until a clear and colourless solution was obtained.

The strongly acid solution of $TiCl_4$ was then heated to approx. 108° C.

After approx. ten minutes at 100° C., a slightly opalescent precipitate formed, becoming a milky suspension. When the first precipitate settled out a 0.2% Praestol 611 BC solution (Stockhausen GmbH & Co, Germany) was added and the solution kept at this temperature for a further two hours.

The precipitate was then filtered off, washed with distilled water and dried at 120° C.

After the drying step, a calcining step was also carried out at 1200° C.

The yield was approx. 6.54 g $TiO_2$ in anatase form.

The $d_{50}$ value was 0.5 µm. The material was finely crystalline without showing agglomerates.

Example 8

Production of $Li_4Ti_5O_{12}$.

147.8 g $Li_2CO_3$ (2 mol) and 399.4 g $TiO_2$ from Example 7 were mixed. A $Li_2CO_3$ excess of approx. 2 to 5% was used. The lithium carbonate is commercially available under the name Lithiumcarbonat Special PC/US 250 ACU from Pharma & Chemie GmbH.

Distilled water was then added accompanied by stirring until a homogeneous viscous mixture was obtained.

The thus-obtained mixture was dried at room temperature and the thus-obtained dried mixture then ground very fine in a grinding treatment, for example with a Fritsch disk mill with a gap width of typically 0.25 mm.

The mixture was then calcined for four hours at approx. 950° C. in a Navatherm-Ceramotherm N45040 oven.

The obtained product was then characterized by powder diffraction analysis and the reflexes correspond to that of pure lithium titanate $Li_4Ti_5O_{12}$. No detectable quantities of rutile were found in the end-product.

The $d_{50}$ value was 0.7 µm. The material was finely crystalline without showing agglomerates.

Example 9

Synthesis of Carbon-Coated $Li_4Ti_5O_{12}$

The lithium titanate obtained in Example 8 was ground once more with an air-jet (AFG 100 air-jet mill), and stirred with a cold concentrated lactose solution to a viscous suspension. The suspension was dried at 100° C. for 12 hours and optionally ground in a Fritsch disk mill with a gap of 0.25 mm.

The ground material was heated to 750° C. under protective gas in a so-called Linn furnace and then calcined for three hours at 750° C.

The obtained product was given a final grinding in a Fritsch mill with a 0.8 mm screen.

The obtained product corresponded to the carbon-coated particles described in WO02/46101, except that the particles obtained according to aspects of the invention have a particularly fine particle distribution of 0.3 to 0.8 µm and also displayed no agglomeration behaviour.

It is also to be observed in this example that, through the addition of the flocculant, the finely crystalline character of the originally obtained $TiO_2$ was also retained in the end product $Li_4Ti_5O_{12}$ both with and without carbon coating. It goes without saying that the further carbon sources described in WO02/46101 can also be used instead of lactose.

The $d_{50}$ value was 0.7 µm. The material was finely crystalline without showing agglomerates.

Example 10

Synthesis of $LiFePO_4$ (Hydrothermal Reaction)

1. Production of the Precursor Suspension 8.746 kg $LiOH \cdot H_2O$ was dissolved in approx. 50 l deionized water in a container and the solution introduced first into a 200-l autoclave with stirrer via a monopump and stirred at 40 to 80 rpm.

18.61 kg $FeSO_4 \cdot 7H_2O$ was then dissolved in 30 to 35 l deionized water in a vessel and 7.8 kg 85% phosphoric acid slowly added accompanied by stirring. The acid solution was pumped into the autoclave via the monopump. A mixture of $Fe_3(PO_4)_2 \cdot 8H_2O$ and $Li_3PO_4$ immediately began to precipitate in the autoclave.

The suspension formed was then cooled to approx. 30° C. and a 0.2% aqueous solution of the weakly cationic surface-active agent Praestol 611 BC (Stockhausen GmbH & Co., Germany) added to the suspension. The addition took place dropwise over a few minutes, preferably approx. 5 to 10 minutes.

Unlike the synthesis without addition of the surface-active agent, a finely-crystalline suspension forms instead of the previously observed pudding-like consistency of the suspension, as was described e.g. in WO 2005/051840 A1.

The dispersion or grinding treatment required in the international patent application described here as well as the pumping round of the highly-viscous solid paste are dispensed with in the present method according to aspects of the invention.

After the precipitation had taken place the $Fe_3(PO_4)_2 \cdot 8H_2O/Li_3PO_4$ suspension was pumped round for a further approx. 2 hours. An ideal mixture of the precipitated precursor substances $Fe_3(PO_4)_2 \cdot 8H_2O$ and $Li_3PO_4$ is thus achieved.

Typically a so-called centrifugal pump can be used.

After the thorough mixing of the two precursor substances by means of pumping round, the autoclave was sealed in pressure-tight manner and heated to 160° C. for 2 hours accompanied by constant stirring at 90 to 100 rpm and kept at this temperature for 10 hours. The reaction mixture was then cooled to room temperature within 3 to 4 hours and the obtained finely-crystalline $LiFePO_4$ suspension filtered off and washed with ionized water until the conductivity of the washing water was less than 4 µS/cm.

The $d_{50}$ value was 0.5 µm. The material was finely crystalline without showing agglomerates.

Example 11

Synthesis of Carbon-Coated $LiFePO_4$

The $LiFePO_4$ obtained in Example 10 was coated with carbon as in Example 3. Instead of cellulose acetate, a corresponding quantity of lactose monohydrate was used as carbon source.

Typically approx. 90 g lactose monohydrate in 350 g deionized water was used to achieve an approx. 2% carbon coating on the finished finely-crystalline product per kilogram of dry $LiFePO_4$ powder.

The electric conductivity of the obtained product was greater than $1 \times 10^{-8}$ cm. The thus-obtained sample contained approx. 2.2 percent by weight carbon.

The $d_{50}$ value was 0.6 µm. The material was finely crystalline without showing agglomerates.

The invention claimed is:

1. A nanoparticulate composition in the form of a dried, finely particulate powder, comprising non-agglomerated nanoparticles of a transition metal compound with a particle-size distribution $d_{90} \leq 10$ µm and $d_{50}$ of 0.4 to 0.7 µm, wherein the nanoparticles are composed of a material comprising $FePO_4 \cdot 2H_2O$, $Fe_2(PO_4)_2$, or mixtures thereof; and wherein the composition further comprises a surface-active agent in a quantity of 0.01 to 1 wt. % relative to the total weight of the composition.

2. Composition according to claim 1, wherein the nanoparticles are present in crystalline state.

3. Composition according to claim 1, wherein the nanoparticles have a carbon-containing coating.

4. Composition according to claim 1, wherein the composition is sulphate-free.

5. Composition according to claim 1, wherein the surface-active agent has an ionic character.

* * * * *